(12) United States Patent
Nadgowda

(10) Patent No.: US 12,010,145 B2
(45) Date of Patent: Jun. 11, 2024

(54) CERTIFICATION OF COMPUTER PIPELINE RESULTS

(71) Applicant: International Business Machines Corporation, Armonk, NY (US)

(72) Inventor: Shripad Nadgowda, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 435 days.

(21) Appl. No.: 17/388,497

(22) Filed: Jul. 29, 2021

(65) Prior Publication Data

US 2023/0035522 A1    Feb. 2, 2023

(51) Int. Cl.
*H04L 9/40*    (2022.01)

(52) U.S. Cl.
CPC .......... *H04L 63/20* (2013.01); *H04L 63/0823* (2013.01); *H04L 63/0876* (2013.01); *H04L 63/105* (2013.01)

(58) Field of Classification Search
CPC . H04L 63/20; H04L 63/0823; H04L 63/0876; H04L 63/105; G06F 21/51; G06F 21/577; G06F 2221/033
USPC ............................................................ 726/1
See application file for complete search history.

(56) References Cited

U.S. PATENT DOCUMENTS

| | | | |
|---|---|---|---|
| 9,824,364 B2 | 11/2017 | Galligan Davila et al. | |
| 10,713,664 B1 | 7/2020 | Alagappan et al. | |
| 11,514,171 B2 * | 11/2022 | Dinh | G06N 5/022 |
| 2013/0173606 A1 * | 7/2013 | Pasumarthi | G06F 16/24578 |
| | | | 707/723 |
| 2020/0379879 A1 | 12/2020 | Plotnik et al. | |
| 2021/0075814 A1 | 3/2021 | Bulut et al. | |
| 2021/0141718 A1 * | 5/2021 | Sandhu | G06F 8/60 |
| 2022/0083333 A1 * | 3/2022 | Cullum | G06F 8/75 |

(Continued)

FOREIGN PATENT DOCUMENTS

CA    3059699 A1    10/2017

OTHER PUBLICATIONS

Ficorilli et al., Provisioning Pipelines: a Managed DevSecOps Approach to Pipeline Creation. Carnegie Mellon University Software Engineering Institute Pittsburgh United States, 2020.

(Continued)

*Primary Examiner* — Kambiz Zand
*Assistant Examiner* — Aubrey H Wyszynski
(74) *Attorney, Agent, or Firm* — Amin, Turocy & Watson, LLP

(57) ABSTRACT

Techniques regarding pipeline security compliance are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a certification component that certifies a result from an execution of a pipeline for a computer application based on a comparison of an implemented security control profile associated with the pipeline and an applicable security control profile identified from a source artifact associated with the computer application.

20 Claims, 13 Drawing Sheets

(56) References Cited

U.S. PATENT DOCUMENTS

2022/0121480 A1* 4/2022 Chivukula ............... G06F 9/48

OTHER PUBLICATIONS

Woody et al. DevSecOps Pipeline for Complex Software Intensive Systems: Addressing the Cybersecurity Challenges. Carnegie-Mellon Univ Pittsburgh PA Pittsburgh United States, 2020.
Diaz, et al. "Self-service cybersecurity monitoring as enabler for DevSecOps." IEEE Access 7 (2019): 100283-100295.
Chick, MBSE for DevSecOps CI/CD Pipeline. Carnegie-Mellon Univ Pittsburgh PA, 2021.
Mell et al., "The NIST Definition of Cloud Computing," Recommendations of the National Institute of Standards and Technology, NIST Special Publication 800-145, Sep. 2011, 7 pages.

* cited by examiner

CERTIFICATION OF COMPUTER PIPELINE RESULTS

BACKGROUND

The subject disclosure relates to the certification of the results from one or more computer pipelines (e.g., development, security, and operations ("DevSecOps") pipelines), and more specifically, to automated certification of one or more pipeline results as compliant with applicable end-to-end security controls.

In computing, pipelines comprise a series of data processing steps that can facilitate the transfer of data between locations (e.g., between computer applications, a computer application and a data warehouse, a data repository and an analysis database, and/or the like). Development and operations ("DevOps") pipelines can be pipelines comprising a set of automated data processing steps that can enable developers and operations entities to collaborate on building and/or deploying a computer application in a product environment. DevSecOps pipelines can further expand upon the principals of DevOps pipelines by enabling information technology ("IT") security entities to collaborate with the developers and operations entities on building and/or deploying a computer application.

However, pipelines (e.g., DevSecOps pipelines) can be susceptible to one or more compliance deficiencies with regards to target security controls. For example, in DevSecOps pipelines, multiple security controls (e.g., vulnerability scanner, cis scanner, license scanner, a combination thereof, and/or the like) can be implemented separately and assembled into the data pipeline. Yet, applicable security controls may be absent from the pipeline; thereby, compromising the pipeline security compliance. In another example, the security controls included in a pipeline can have various configuration parameters that can determine outcome task results. Misconfigured security control parameters can also compromise the pipeline security compliance. In a further example, the security controls included in a pipeline can be implemented against various types of static source artifacts from a code repository, with respective security controls pertinent to different source artifacts. Implementing security controls that are impertinent to the source artifacts of a given computer application can also compromise the pipeline security compliance.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can regard certification of one or more pipeline results with regards to security compliance are described.

According to an embodiment, a system is provided. The system can comprise a memory that stores computer executable components. The system can also comprise a processor, operably coupled to the memory, and that can execute the computer executable components stored in the memory. The computer executable components can comprise a certification component that certifies a result from an execution of a pipeline for a computer application based on a comparison of an implemented security control profile associated with the pipeline and an applicable security control profile identified from a source artifact associated with the computer application. An advantage of such a system can be the enablement of an automated security compliance analysis for one or more pipelines.

In some examples, the system can further comprise an artifact categorization component that can scan static code assets from a code repository to categorize source artifacts. Also, the system can comprise an artifact mapping component that can generate an artifact map that can correlate categorized source artifacts to one or more security controls. An advantage of such a system can be the identification of applicable security controls based on source artifacts.

According to an embodiment, a computer-implemented method is provided. The computer-implemented method can comprise certifying, by a system operatively coupled to a processor, a result from an execution of a pipeline for a computer application based on a comparison of an implemented security control profile associated with the pipeline and an applicable security control profile identified from a source artifact associated with the computer application. An advantage of such a computer-implemented method can be determining whether one or more security controls are missing from a pipeline.

In some examples, the computer-implemented method can further comprise scanning, by the system, static code assets from a code repository to categorize source artifacts. Also, the computer-implemented method can comprise generating, by the system, an artifact map that correlates categorized source artifacts to one or more security controls. Additionally, the computer-implemented method can comprise identifying, by the system, the source artifact associated with the computer application. Moreover, the computer-implemented method can comprise generating, by the system, the applicable security control profile by identifying the one or more security controls correlated to the identified source artifact via the artifact map. An advantage of such a method can be the automated determination of applicable security controls.

According to an embodiment, a computer program product for pipeline certification is provided. The computer program product can comprise a computer readable storage medium having program instructions embodied therewith. The program instructions can be executable by a processor to cause the processor to certify, by the processor, a result from an execution of a pipeline for a computer application based on a comparison of an implemented security control profile associated with the pipeline and an applicable security control profile identified from a source artifact associated with the computer application. An advantage of such a computer program product can be the incorporation of one or more security protocols into the development and/or operation of one or more computer applications via a pipeline.

In some example, the program instructions can further cause the processor to generate, by the processor, a configuration map that correlates pipeline parameter configurations to security controls. Also, the program instructions can cause the processor to identify, by the processor, a parameter configuration of the pipeline. Additionally, the program instructions can cause the processor to generate, by the processor, the implemented security control profile by identifying an implemented security control correlated to the parameter configuration via the configuration map. An advantage of such a computer program product can be the identification of implemented security controls based on the parsing of pipeline definitions and/or parameter configurations.

DETAILED DESCRIPTION

Figure 1:
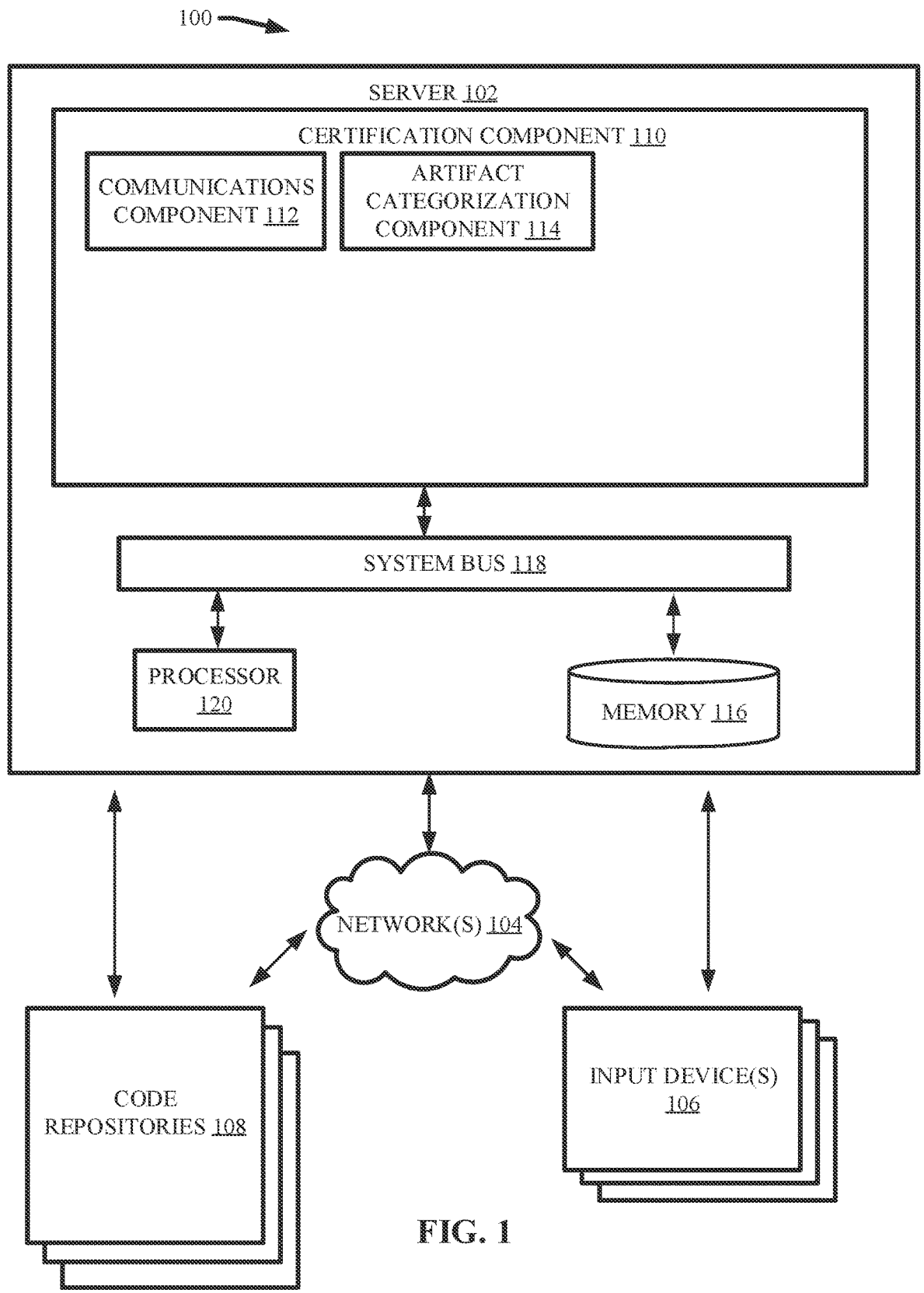
FIG. 1 illustrates a block diagram of an example, non-limiting system that can certify that results from the execution of one or more pipelines (e.g., DevSecOps pipelines, continuous integration/continuous delivery ("CI/CD")) is compliant with one or more target security controls in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of pipeline (e.g., DevSecOps pipelines, CI/CD pipelines, and/or the like) security compliance; the present disclosure can be implemented to produce a solution to one or more of these problems by autonomously certifying the results from execution of a pipeline (e.g., DevSecOps pipeline, CI/CD pipeline, and/or the like). Advantageously, one or more embodiments described herein can discover security controls applicable to a given pipeline, identify security controls implemented by the pipeline, and determine whether the implemented security controls are compliant with the applicable security controls. Thereby, one or more embodiments described herein can determine whether a given pipeline (e.g., DevSecOps pipeline, CI/CD pipeline, and/or the like) comprises missing security controls, non-applicable security controls, and/or misconfigurations of security control parameters.

Various embodiments of the present invention can be directed to computer processing systems, computer-implemented methods, apparatus and/or computer program products that facilitate the efficient, effective, and autonomous (e.g., without direct human guidance) certification of pipeline (e.g., DevSecOps pipeline, CI/CD pipeline) with regards to security compliance. For example, one or more embodiments described herein can categorize computer code artifacts sourced from a code repository and map the categorized artifacts to one or more security controls. Additionally, one or more embodiments can analyze the source artifacts of a given computer application being developed and/or deployed by the pipeline to generate a profile of applicable security controls. Further, various embodiments described herein can map one or more pipeline definitions and/or configurations to one or more security controls based on, for example, tasks associated with the definitions and/or configurations. Moreover, the one or more embodiments can analyze the definitions and/or configurations of the given pipeline (e.g., DevSecOps pipeline, CI/CD pipeline) to generate a profile of implemented security controls. Thereby, one or more embodiments described herein can determine whether execution of a given pipeline (e.g., DevSecOps pipeline, CI/CD pipeline) for the given computer application meets security compliance via a comparison of the applicable security controls profile and the implemented security controls profile.

The computer processing systems, computer-implemented methods, apparatus and/or computer program products employ hardware and/or software to solve problems that are highly technical in nature (e.g., pipeline result certification), that are not abstract and cannot be performed as a set of mental acts by a human. For example, an individual, or a plurality of individuals, cannot readily map categorized source artifacts and/or parsed pipeline configurations to security controls in accordance with the various embodiments described herein.

Also, one or more embodiments described herein can constitute a technical improvement over typical pipeline executions by autonomously certifying that results from an execution of a pipeline are compliant with one or more target security controls. Further, one or more embodiments described herein can have a practical application by establishing an automated security compliance review of pipeline results for development and/or deployment of one or more computer applications. For instance, various embodiments described herein can determine whether execution of a given pipeline comprises applicable security controls.

FIG. 1 illustrates a block diagram of an example, non-limiting system 100 that can certify execution of one or more pipeline (e.g., DevSecOps pipelines, CI/CD pipelines, and/or the like). Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, input devices 106, and/or code repositories 108. The server 102 can comprise certification component 110. The certification component 110 can further comprise communications component 112 and/or artifact categorization component 114. Also, the server 102 can comprise or otherwise be associated with at least one memory 116. The server 102 can further comprise a system bus 118 that can couple to various components such as, but not limited to, the certification component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or code repositories 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the communications component 112 can be provided on the one or more servers 102, it should be appreciated that the architecture of system 100 is not so limited. For example, the communications component 112, or one or more components of communications component 112, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more computer applications into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In one or more embodiments, the one or more code repositories 108 can be software archives of computer programming source codes. The source codes can be computer program codes previously developed for one or more functions and stored in the one or more code repositories 108 for later use. For example, the source codes can be retrieved from the one or more code repositories 108 to execute the original function of the code and/or to be modified in order to execute a different function. Constructing new programming codes by modifying existing source codes can expedite the program development process. In various embodiments, the one or more code repositories 108 can include one or more source code archives, a hosting facility for managing and/or accessing the archives, technical documentations, web pages, snippets, patches, a combination thereof, and/or the like.

In various embodiments, the communications component 112 can receive input data from the one or more input devices 106 and share the input data with one or more associate components of the certification component 110. The input data can comprise, for example: pipelines; pipeline definitions, parameters, and/or configurations, a combination thereof, and/or the like. Additionally, the communications component 112 can receive computer code data from the one or more code repositories 108 and share the computer code data with one or more associate components of the certification component 110. The computer code data can comprise, for example, one or more source codes and/or source artifacts that can be implemented in one or more pipelines to facilitate development and/or deployment of one or more computer applications.

In one or more embodiments, the artifact categorization component 114 can scan static code assets from the one or more code repositories 108 to categorize source artifacts. For example, the artifact categorization component 114 can assign source artifacts of the code repositories 108 to one or more categories based on one or more characteristics of the source artifacts. For instance, source artifacts assigned to the same category can exhibit similar characteristics. In various embodiments, the artifact categorization component 114 can employ one or more machine learning algorithms to classify and/or categorize the one or more source artifacts. For instance, the artifact categorization component 114 can employ one or more neural networks to perform one or more classification tasks with regards to the source artifacts of the one or more code repositories 108.

Figure 2:
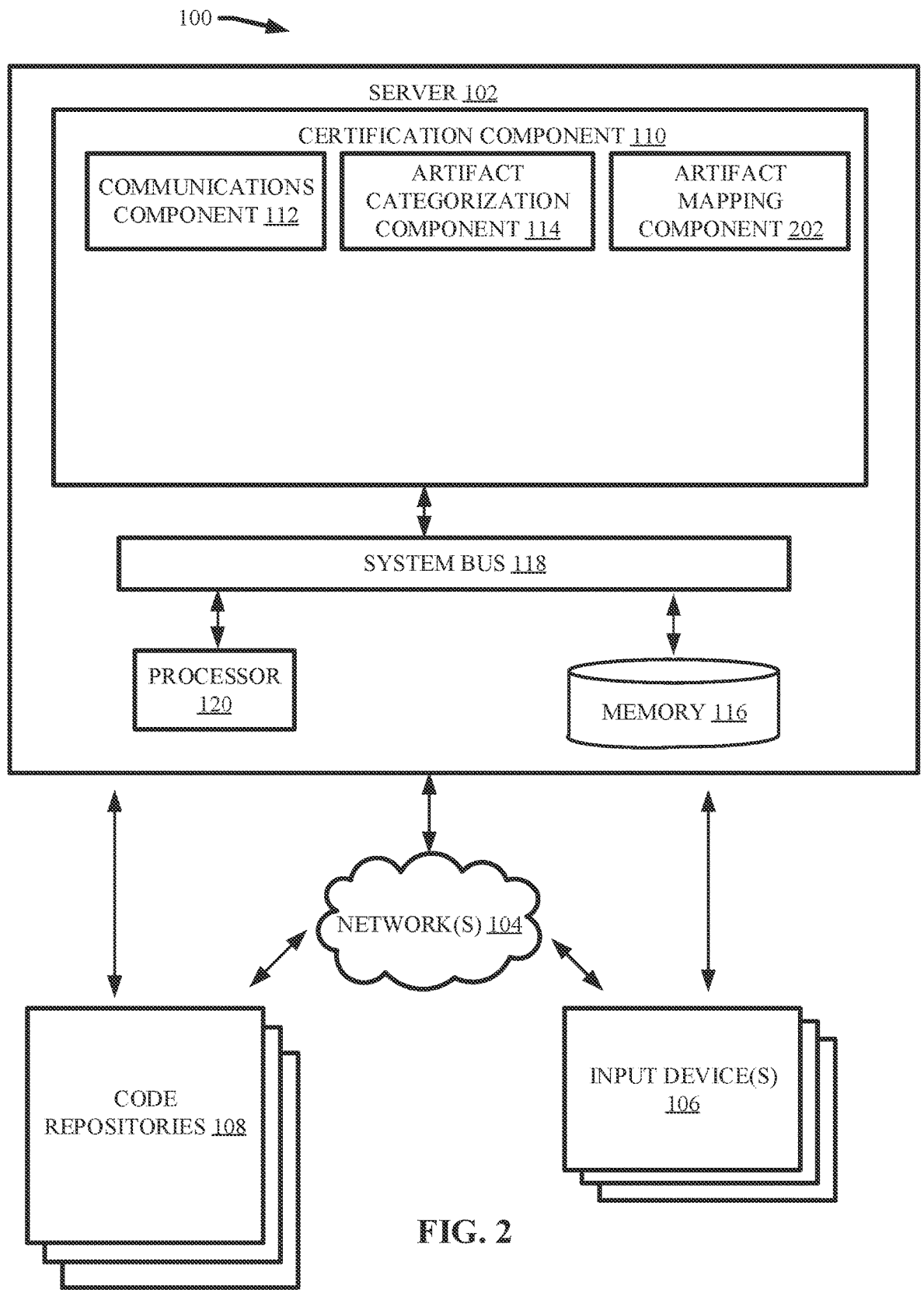
FIG. 2 illustrates a block diagram of an example, non-limiting system that can map source artifacts to one or more security controls in accordance with one or more embodiments described herein.

FIG. 2 illustrates a diagram of the example, non-limiting system 100 further comprising artifact mapping component 202 in accordance with one or more embodiments described herein. Repetitive description of like elements employed in other embodiments described herein is omitted for sake of brevity. In various embodiments, the artifact mapping component 202 can generate one or more artifact maps that can correlate the categorized source artifacts to one or more security controls.

For example, the artifact mapping component 202 can map one or more security controls to the source artifact categories. For instance, each category of source artifacts can be associated with one or more security controls. In various embodiments, the security controls can include safeguards and/or countermeasures for avoiding, minimizing, detecting, and/or counteracting security risks to computer applications and/or data developed and/or deployed via a given pipeline (e.g., DevSecOps pipeline, CI/CD pipeline, and/or the like). Example types of security controls can include, but are not limited to: preventative controls, detective controls, corrective controls, access controls, procedural controls, technical controls, compliance controls, a combination thereof and/or the like. For instance, example security controls can include, but are not limited to: a vulnerability scanner, a license scanner, CIS controls, configuration analysis, risk analysis, a combination thereof, and/or the like.

In various embodiments, each task in the pipeline can be responsible for one or more security controls. Upon inclusion in the pipeline (e.g., as a part of this on-boarding), the tasks can be defined with all applicable security controls. For instance, the applicable security controls associated with a given task can be defined based on inclusion of the task in the pipeline. For example, where a given pipeline includes a task, the security control associated with the task can be defined as an applicable security control (e.g., applicable security controls can be implemented by the pipeline in order for the certification component 110 to certify the results of the pipeline). The mappings can be performed manually and/or via one or more machine learning models (e.g., performing one or more machine learning tasks through supervised learning).

In various embodiments, one or more characteristics shared by the source artifacts of a given category can correlate to the employment of the one or more security controls assigned to the given category. For example, where artifacts are characterized as deployment files, the artifacts can be subjected to Center for Internet Security ("CIS") checks and/or configuration analysis. In another example, where artifacts are characterized as build artifacts, the artifacts can be subjected to vulnerability scanning and/or license auditing. Where a computer application includes one or more source artifacts, the one or more security controls mapped to the one or more categories associated with the source artifacts can be security controls applicable in execution of one or more pipelines for the computer application.

Figure 3:
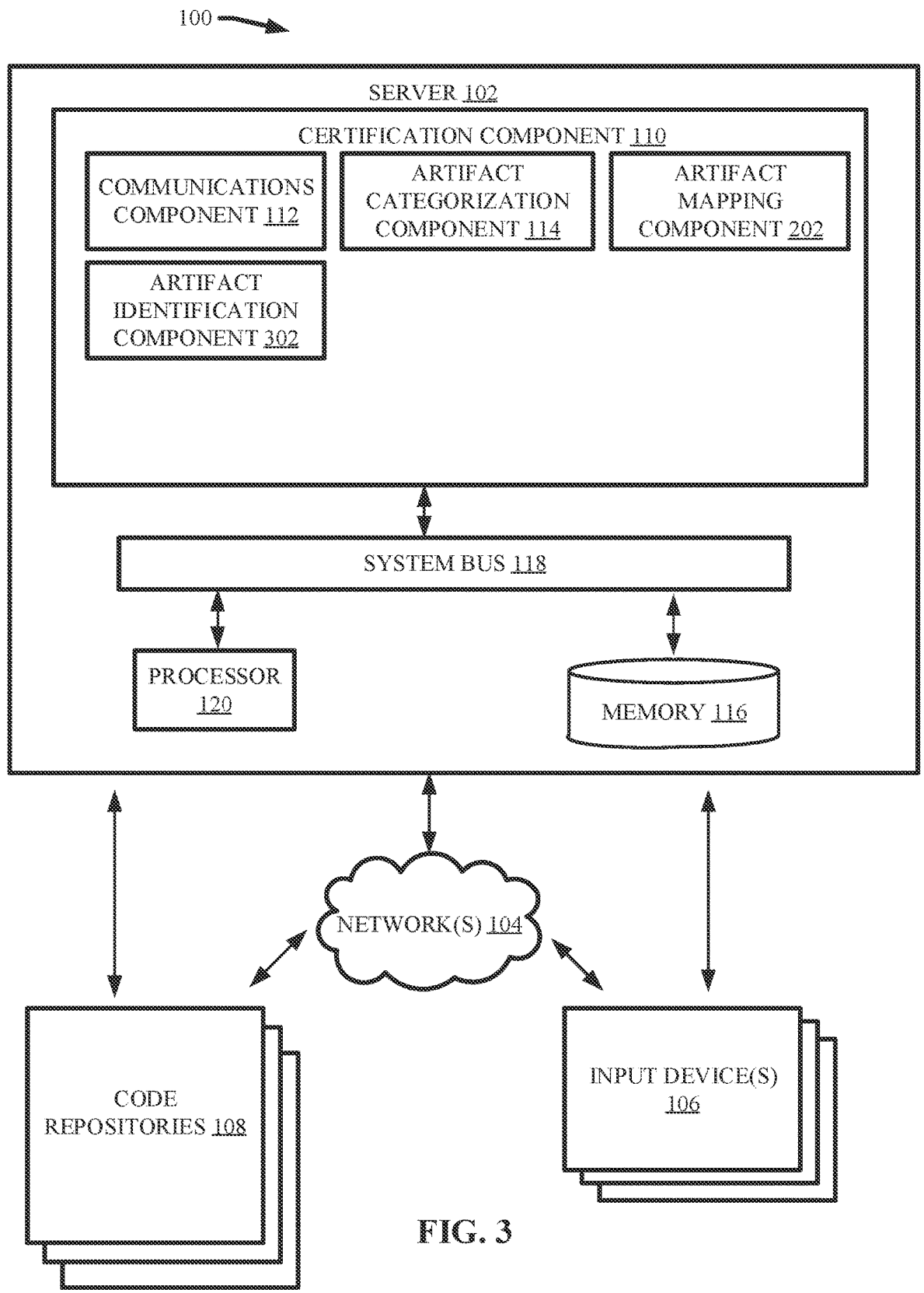
FIG. 3 illustrates a block diagram of an example, non-limiting system that can identify one or more source artifacts included in one or more computer applications being developed and/or deployed via a pipeline in accordance with one or more embodiments described herein.

FIG. 3 illustrates a diagram of the example, non-limiting system 100 further comprising artifact identification component 302 in accordance with one or more embodiments described herein. Repetitive description of like elements employed in other embodiments described herein is omitted for sake of brevity. In various embodiments, the artifact identification component 302 can identify one or more source artifacts associated with a computer application being developed and/or deployed via a pipeline being analyzed by the certification component 110.

In one or more examples, the artifact identification component 302 can analyze one or more computer applications being developed and/or deployed via the execution of a pipeline that is subject to analysis by the certification component 110. Example types of source artifacts that can be identified by the artifact identification component 302 can include, but are not limited to: code artifacts (e.g., test suites, setup scripts, compiled code, test output), documentation artifacts (e.g., diagrams, end-user agreements, interna documents), project management artifacts, a combination thereof, and/or the like.

In various embodiments, source artifacts cab be identified and categorized by their extensions, naming practices, parsing contents, and/or combination thereof. For example, deployment artifacts can be identified by their extension formats (e.g., .vaml and/or .vml extensions). Similarly, build artifacts could include Dockerfile package manifests such as: requirements.text, package-lock.json, and/or terraform files with .tf extension. In additional examples, the artifacts can be identified by established practices and/or standards around file naming that can be leveraged for categorization.

Figure 4:
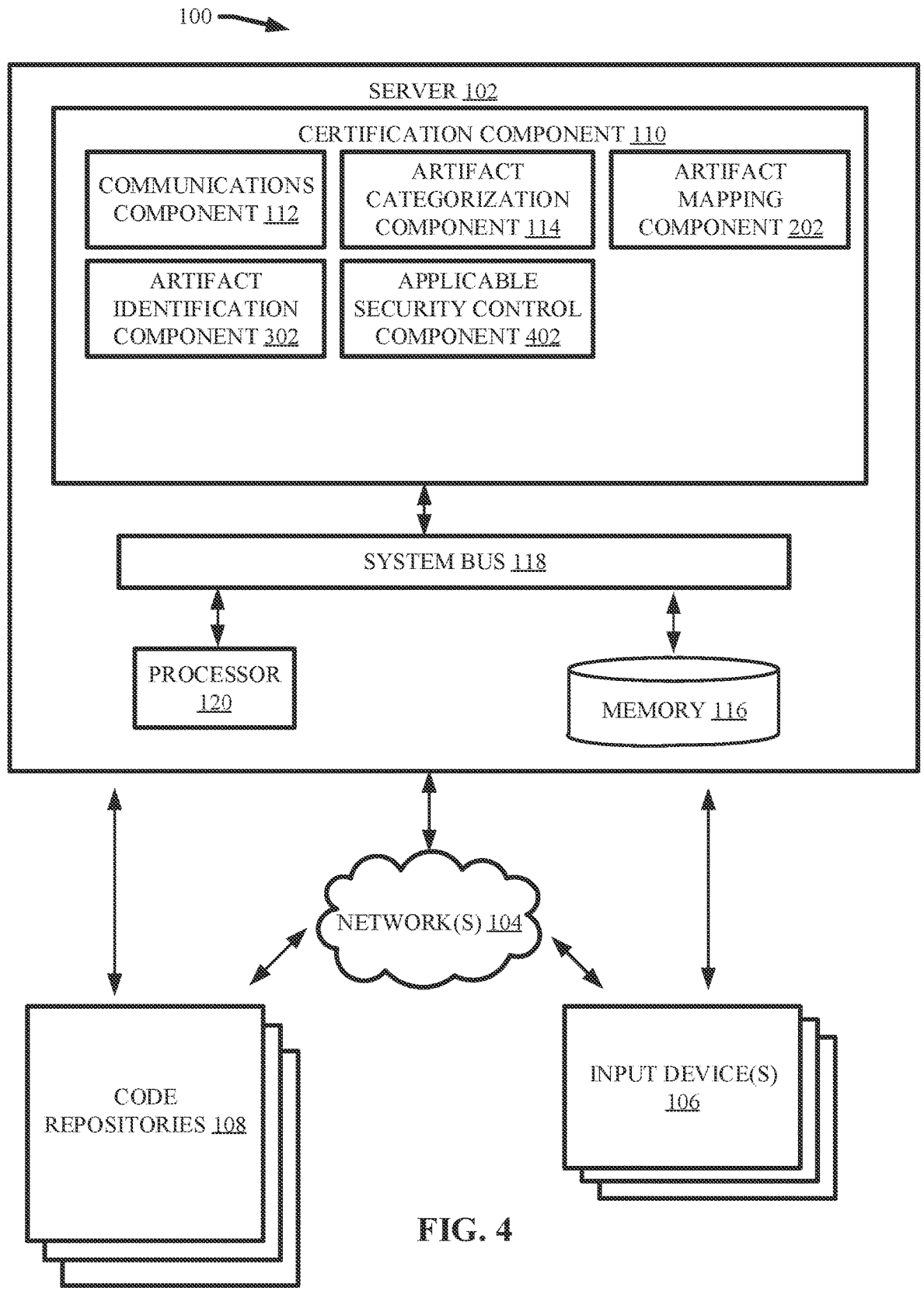
FIG. 4 illustrates block diagram of an example, non-limiting system that can generate one or more profiles of applicable security controls for one or more computer applications being developed and/or deployed via a pipeline in accordance with one or more embodiments described herein.

FIG. 4 illustrates a diagram of the example, non-limiting system 100 further comprising applicable security control component 402 in accordance with one or more embodiments described herein. Repetitive description of like elements employed in other embodiments described herein is omitted for sake of brevity. In various embodiments, the applicable security control component 402 can generate an applicable security control profile by identifying the one or more security controls correlated to the identified source artifact via the one or more artifact maps generated by the artifact mapping component 202.

For example, the applicable security control component 402 can compare the source artifacts identified by the artifact identification component 302 with the one or more artifact maps generated by the artifact mapping component 202. For instance, for an identified source artifact of a first type, the applicable security control component 402 can reference the one or more artifact maps to identify which category comprises source artifacts of the first type. Further, the applicable security control component 402 can reference the one or more artifact maps to identify the one or more security controls associated with the category of the identified source artifact. Thereby, the applicable security control component 402 can identify one or more security controls applicable for the given source artifact identified from the computer application.

Moreover, the applicable security control component 402 can identify the applicable security controls associated with each of the source artifacts identified from the computer application. Further, the applicable security control component 402 can compile all the identified applicable security controls to generate the one or more applicable security control profiles. In various embodiments, the one or more applicable security control profiles can include a list of applicable security controls associated (e.g., based on the one or more artifact maps) with the identified source artifacts from the computer application being developed and/or deployed via the pipeline being analyzed by the certification component 110.

Figure 5:
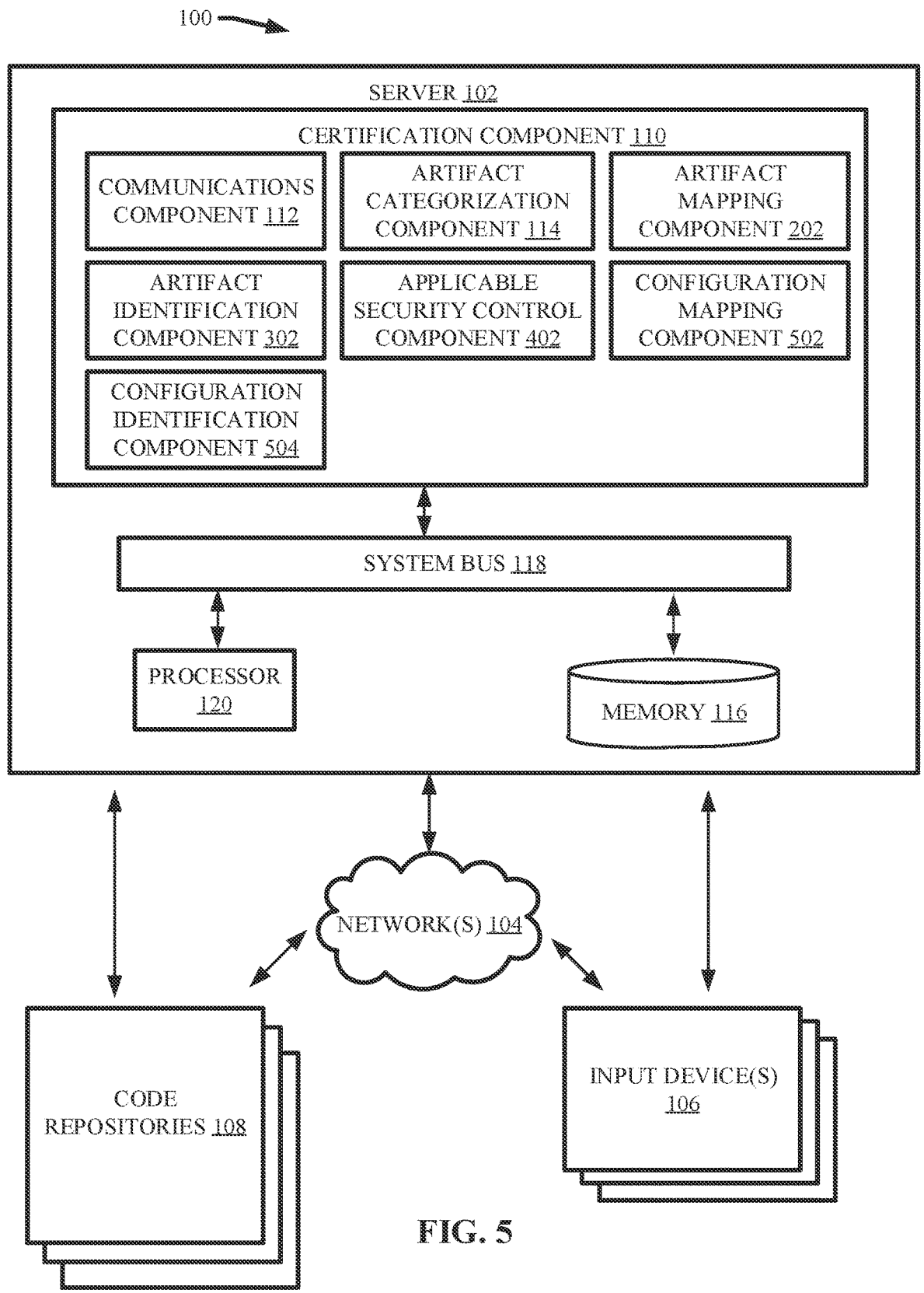
FIG. 5 illustrates a block diagram of an example, non-limiting system that can map pipeline definitions and/or parameter configurations to one or more security controls, and/or identify one or more definitions and/or parameter configurations employed by one or more pipelines in accordance with one or more embodiments described herein.

FIG. 5 illustrates a diagram of the example, non-limiting system 100 further comprising configuration mapping component 502 and/or configuration identification component 504 in accordance with one or more embodiments described herein. Repetitive description of like elements employed in other embodiments described herein is omitted for sake of brevity. In various embodiments, the configuration mapping component 502 can generate one or more configuration maps that can correlate one or more pipeline definitions and/or configurations to one or more security controls.

For example, the configuration mapping component 502 can discover one or more previously implemented pipelines from the one or more code repositories 108 (e.g., each code repository 108 can be configured with one or more pipelines). Further, the configuration mapping component 502 can identify security controls implemented by the one or more discovered pipelines. Additionally, the configuration mapping component 502 can determine which definitions and/or parameter configurations of the discovered pipelines are associated with the identified security controls. For example, tasks in the pipeline can be statically defined to cover certain security controls (e.g., a task from a third-party vendor for vulnerability scanning can be associated with a RA-5 security control). Mapping of pipeline tasks to security controls can be performed manually and/or via one or more machine learning models (e.g., performing one or more machine learning tasks through supervised learning). Thereby, the configuration mapping component 502 can generate one or more configuration maps correlating pipeline definitions and/or parameter configurations with security controls. In one or more embodiments, the configuration mapping component 502 can identify one or more tasks executed by the one or more discovered pipelines and security controls implemented during execution of the tasks. Thereby, the one or more configuration maps can also correlate computing tasks to one or more security controls. Thus, in various embodiments, the configuration mapping component 502 can map possible security controls to pipeline definitions and/or parameter configuration employed by previous pipelines to generate one or more configuration maps, which can subsequently be employed by the certification component 110 to identify security controls implemented by a given pipeline based on the definitions and/or parameter configurations included in the given pipeline.

In various embodiments, the configuration identification component 504 can identify one or more definitions and/or configurations of a pipeline subject to analysis by the certification component 110. For example, the configuration identification component 504 can parse one or more definitions and/or parameter configurations of a pipeline being executed for one or more computer applications analyzed by the artifact identification component 302. The pipeline definitions can follow one or more standardized schema, thereby enabling a parsing of the pipeline definitions by scanning their respective files and/or data. For example, a semantic parser can be employed that parses the contents and semantically discover various components and/or configurations of pipeline. In one or more embodiments, the configuration identification component 504 can determine one or more computing tasks executed by the pipeline based on the one or more parsed definitions and/or parameter configurations. For example, the configuration identification component 504 can employ one or more machine learning models trained on the one or more discovered pipelines to cluster pipeline definitions and/or parameter configurations with computing tasks. In another example, the configuration identification component 504 can reference one or more databases of known correlations between pipeline definitions and/or parameter configurations with computing tasks.

Figure 6:
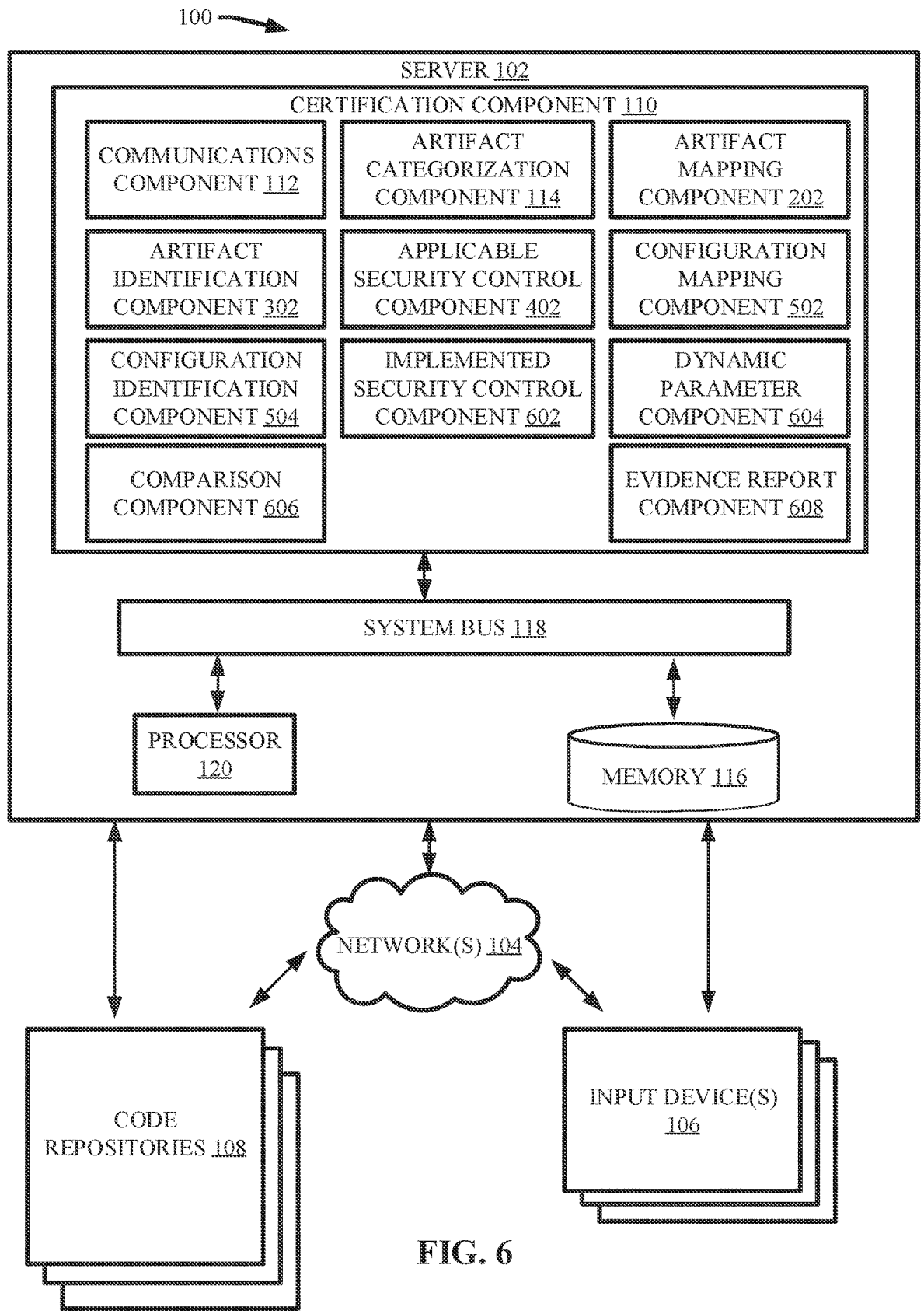
FIG. 6 illustrates a block diagram of an example, non-limiting system that can generate one or more profiles of security controls implemented by a pipeline and/or compare the implemented security controls to security controls applicable to one or more computer applications being developed and/or deployed via one or more pipelines in accordance with one or more embodiments described herein.

FIG. 6 illustrates a diagram of the example, non-limiting system 100 further comprising implemented security control component 602, dynamic parameter component 604, comparison component 606, and/or evidence report component 608 in accordance with one or more embodiments described herein. Repetitive description of like elements employed in other embodiments described herein is omitted for sake of brevity. In various embodiments, implemented security control component 602 can generate one or more implemented security control profiles by identifying the one or more implemented security controls correlated to the one or more identified definitions and/or configurations via the one or more configuration maps. For example, the implemented security control component 602 can reference the one or more configuration maps (e.g., generated by the configuration mapping component 502) to correlate one or more security controls to the one or more identified pipeline definitions and/or parameter configurations. For instance, the implemented security control component 602 can correlate each identified pipeline definition and/or parameter configuration with one or more security controls by employing the one or more configuration maps. Thereby, the implemented security control component 602 can ascertain which security controls are being implemented by the pipeline based on the pipeline's definitions and/or parameter configurations. For instance, the one or more identified pipeline definitions and/or parameter configurations can be correlated to one or more computing tasks (e.g., via configuration identification component 504), which can in turn be correlated to one or more security controls (e.g., via implemented security control component 602) via the one or more configuration maps (e.g., generated by the configuration mapping component 502). Thus, in various embodiments the implemented security control component 602 can generate one or more implemented security control profiles, which can delineate security controls implemented by a given pipeline being analyzed by the certification component 110, by correlating definitions and/or parameter configurations identified as included in the given pipeline with possible security controls via the one or more configuration maps.

In one or more embodiments, the dynamic parameter component 604 can alter the one or more applicable security control profiles (e.g., generated by the applicable security control component 402) based on one or more dynamic parameters regarding execution of the one or more pipelines. For example, one or more dynamic parameters regarding execution of the one or more pipelines can be defined via the one or more input devices 106. The dynamic parameters can define one or more operations and/or security control exceptions to be employed during execution of the pipeline. Example operations and/or security control exceptions defined by the one or more dynamic parameters can include, but are not limited to: a license requirement exception, an ignored list of vulnerabilities, a list of allowed and/or approved package dependencies, an authorized signer, a combination thereof, and/or the like. For instance, where an applicable security control that requires a valid license with regards to one or more computer applications, the one or more input devices 106 can be employed to exempt the security control from the applicable security control profile (e.g., thereby rendering the security control inapplicable to execution of the pipeline).

The dynamic parameter component 604 can analyze the one or more applicable security control profile to determine whether one or more dynamic parameters (e.g., entered via the one or more input devices 106) regard one or more applicable security controls. For example, the one or more dynamic parameters can define a security control of interest, and the dynamic parameter component 604 can search the one or more applicable security control profiles for the security control of interest. Where the one or more dynamic parameters define an exception to one or more applicable security controls comprised within the one or more applicable security control profiles, the dynamic parameter component 604 can remove and/or modify the subject applicable security controls from the applicable security control profile to facilitate the exception.

In one or more embodiments, the dynamic parameter component 604 can determine whether the one or more dynamic parameters are permissible prior to modifying the one or more applicable security control profiles. For example, one or more dynamic parameters may be defined, and/or desired, but not permissible with regards to the computer environment in which the pipeline is being executed. For instance, the dynamic parameter component 604 can reference one or more lists of impermissible dynamic parameters (e.g., stored in the one or more memories 116) and compare one or more entered dynamic parameters to the list of impermissible dynamic parameters. Where the dynamic parameter component 604 determines that the one or more entered dynamic parameters are impermissible (e.g., finds the one or more entered dynamic parameters on a list of impermissible dynamic parameters), the dynamic parameter component 604 can refrain from modifying the one or more applicable security control profiles. Where the dynamic parameter component 604 determines that the one or more entered dynamic parameters are permissible (e.g., finds the one or more entered dynamic parameters are not included in a list of impermissible dynamic parameters), the dynamic parameter component 704 can modify the one or more applicable security control profiles (e.g., remove one or more applicable security controls so as to facilitate a defined security control exception).

In various embodiments, the comparison component 606 can compare the one or more applicable security control profiles (e.g., generated by the applicable security control component 402 and/or modified by the dynamic parameter component 604) to the one or more implemented security control profiles to determine the security compliance of the given pipeline for development and/or deployment of the given compute application. For example, the comparison component 606 can compare the implemented security control profile to the applicable security control profile to determine whether the pipeline is implementing a sufficient number of security controls applicable to execution of the pipeline. In one or more embodiments, the certification component 110 (e.g., via the comparison component 606) can certify execution of the pipeline for the computer application base on the implemented security control profile matching the applicable security control profile by a defined threshold. For example, the certification component 110 can certify execution of the data pipeline based on the implemented security control profile including all applicable security controls (e.g., as defined by the applicable security control profile). In another example, the certification component 110 can certify execution of the pipeline based on the implemented security control profile including a define percentage (e.g., defined via the one or more input devices 106), such as 80%, of the applicable security controls.

In one or more embodiments, the comparison component 606 can further compare the security control parameters of the applicable security controls in the applicable security control profile and the implemented security controls in the implemented security control profile. For example, the comparison component 606 can reference one or more databases that delineate acceptable configurations of security control parameters for each security control included in the one or more artifact maps. The comparison component 606 determines that an applicable security control is being implemented by the pipeline, the comparison component 606 can further compare the configuration of security control parameters being employed with the implemented security control with the acceptable configurations associated with the security control. Where the employed configuration of security control parameters matches one or more of the acceptable configurations of security control parameters, the comparison component 606 can determine that the given implemented security control is properly configured (e.g., and thereby results from the pipeline can be certified). Where the employed configuration of security control parameters fails to match one or more of the acceptable configurations of security control parameters, the comparison component 606 can determine that the given implemented security control is misconfigured (e.g., and thereby results from the pipeline will not be certified).

In one or more embodiments, the evidence report component 608 can generate one or more evidence reports that can characterize the comparison performed by the comparison component 606. For example, the one or more evidence reports can include text, figures, video, illustrations, diagrams, charts, graphs, a combination thereof and/or the like. Further, the one or more evidence reports can include, for example: a description of the applicable security controls (e.g., as defined by the one or more applicable security control profiles) associated with the given execution of the pipeline; a description of the implemented security controls (e.g., as defined by the one or more implemented security control profiles) associated with the given execution of the pipeline; modifications to the applicable security control profile performed in accordance with one or more dynamic parameters; dynamic parameters entered but found to be impermissible; security control misconfigurations; a combination thereof, and/or the like.

Figure 7:
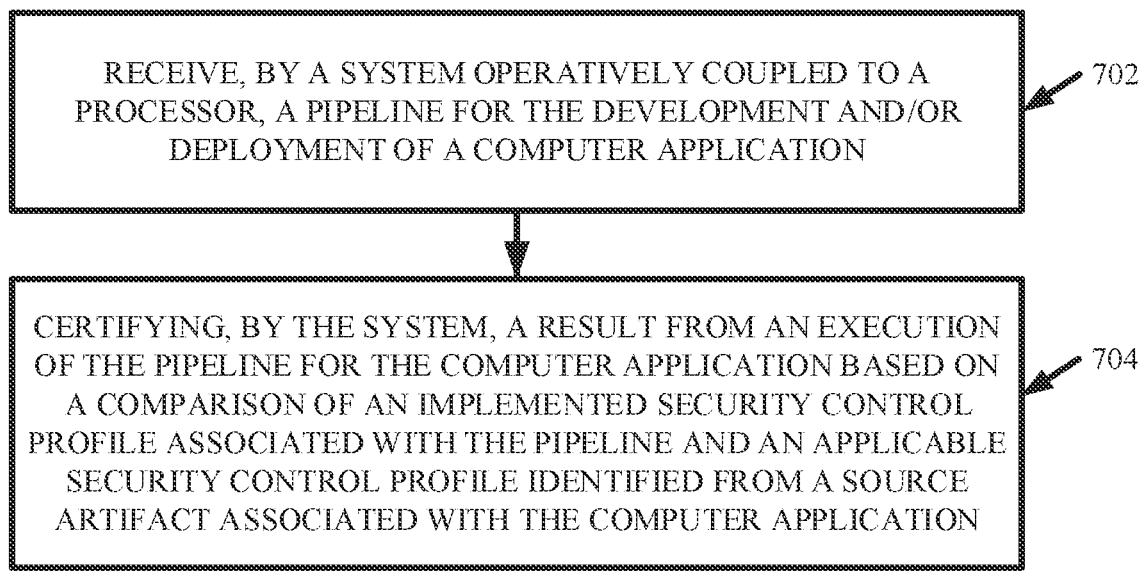
FIG. 7 illustrates a flow diagram of an example, non-limiting computer-implemented method that can facilitate determining whether the results of one or more pipelines are compliant with one or more security standards in accordance with one or more embodiments described herein.

FIG. 7 illustrates a flow diagram of an example, non-limiting computer-implemented method 700 that can facilitate determining whether one or more pipelines are compliant with one or more security standards in accordance with one or more embodiments described herein. Repetitive description of like elements employed in other embodiments described herein is omitted for sake of brevity.

At 702, the computer-implemented method 700 can comprise receiving (e.g., via communications component 112), by a system 100 operatively coupled to a processor 120, one or more pipelines for the development and/or deployment of a computer applications. For example, one or more entities can enter the one or more pipelines into the system 100 via the one or more input devices 106. At 704, the computer-implemented method 800 can comprise certifying (e.g., via certification component 110), by the system 100, execution of the one or more pipelines for the computer application based on a comparison of one or more implemented security control profiles associated with the one or more pipelines and one or more applicable security control profiles identified from one or more source artifacts associated with the computer application.

For example, the one or more applicable security control profiles can be generated (e.g., via the applicable security control component 402) by the system 100 based on a correlation between the one or more source artifacts and security controls in accordance with one or more embodiments described herein. Further, the one or more implemented security control profiles can be generated (e.g., via implemented security control component 602) by the system 100 based on a correlation between pipeline definitions and/or parameter configurations and security controls in accordance with one or more embodiments described herein. In various embodiments, the one or more pipelines can be certified by the system 100 when the applicable security control profile matches, or substantially matches, the implemented security control profile in accordance with one or more embodiments described herein.

Figure 8:
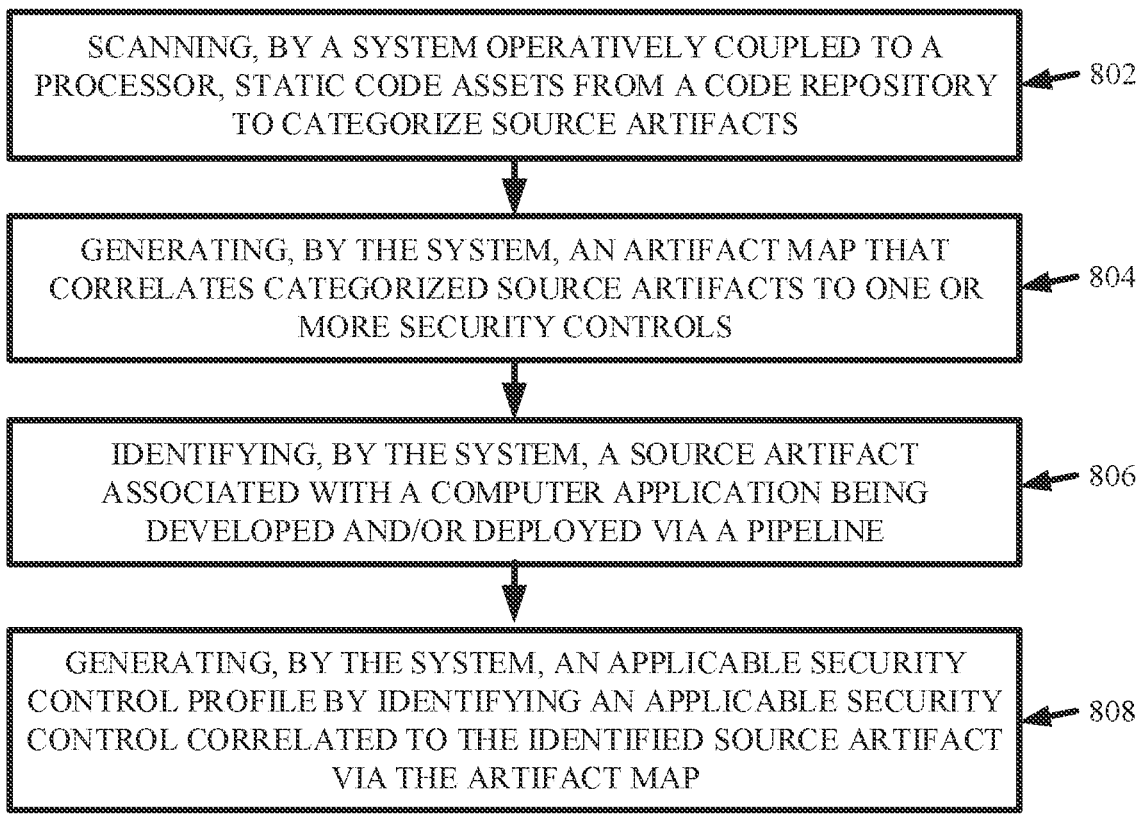
FIG. 8 illustrates a flow diagram of an example, non-limiting computer-implemented method that can facilitate determining whether the results of one or more pipelines are compliant with one or more security standards in accordance with one or more embodiments described herein.

FIG. 8 illustrates a flow diagram of an example, non-limiting computer-implemented method 800 that can facilitate generating one or more applicable security control profiles in accordance with one or more embodiments described herein. Repetitive description of like elements employed in other embodiments described herein is omitted for sake of brevity. In various embodiments, computer-implemented method 800 can be employed to facilitate the certification performed in computer-implemented method 700.

At 802, the computer-implemented method 800 can comprise scanning (e.g., via artifact categorization component 114), by a system 100 operatively coupled to a processor 120, static code assets from one or more code repositories 108 to categorize source artifacts. At 804, the computer-implemented method 800 can comprise generating (e.g., via artifact mapping component 202), by the system 100, one or more artifact maps that can correlate categorized source artifacts to one or more security controls. At 806, the computer-implemented method 800 can comprise identifying (e.g., via artifact identification component 302), by the system 100, one or more source artifacts associated with a computer application being developed and/or deployed via a pipeline (e.g., a DevSecOps pipeline, CI/CD pipeline, and/or the like). At 808, the computer-implemented method 800 can comprise generating (e.g., via applicable security control component 402), by the system 100, one or more applicable security control profiles by identifying applicable security controls correlated to the one or more identified source artifacts via the one or more artifact maps.

Figure 9:
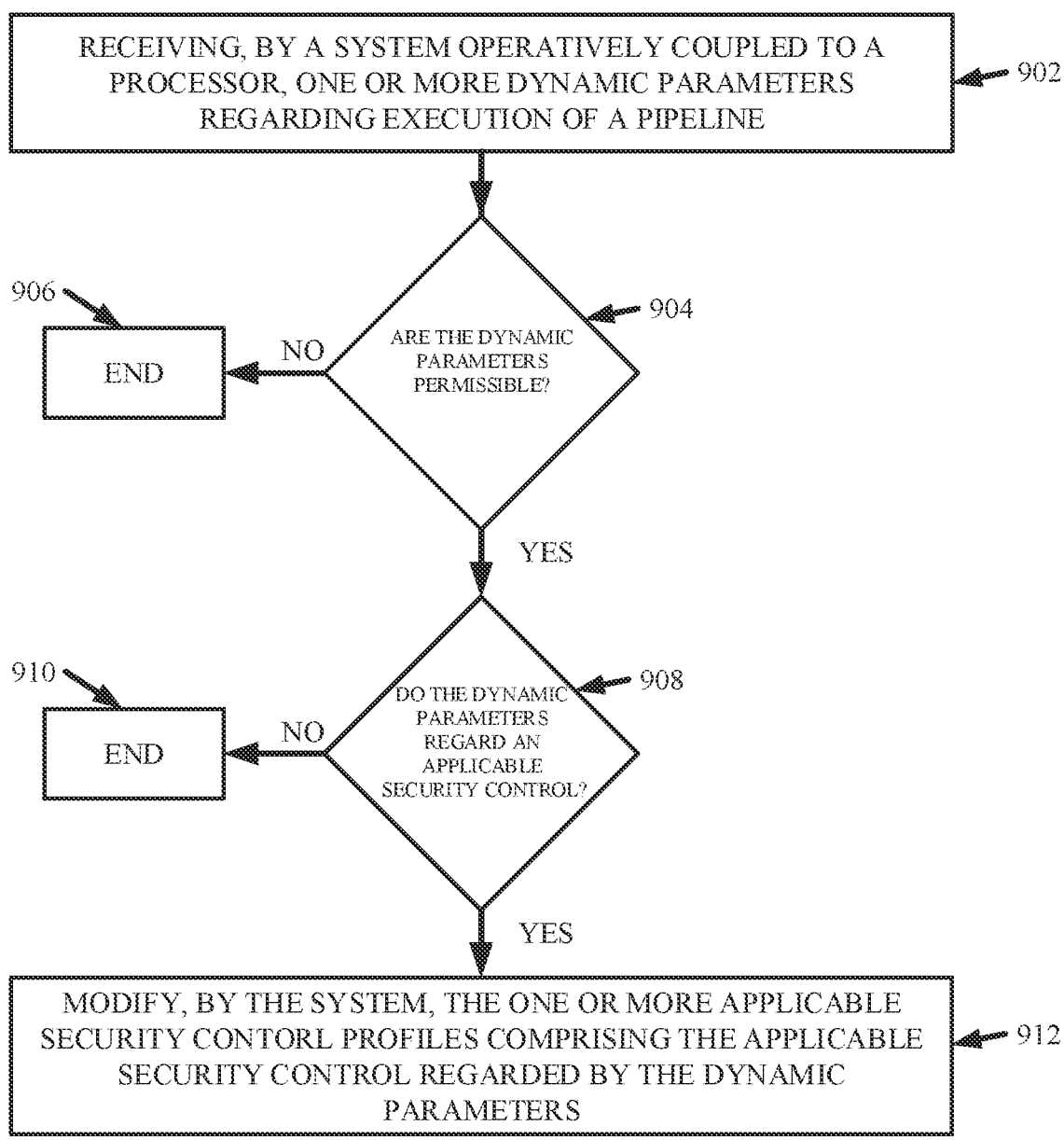
FIG. 9 illustrates a flow diagram of an example, non-limiting computer-implemented method that can facilitate determining whether the results of one or more pipelines are compliant with one or more security standards in accordance with one or more embodiments described herein.

FIG. 9 illustrates a flow diagram of an example, non-limiting computer-implemented method 900 that can facilitate processing one or more dynamic parameters in executing one or more pipelines in accordance with one or more embodiments described herein. Repetitive description of like elements employed in other embodiments described herein is omitted for sake of brevity. In various embodiments, computer-implemented method 900 can be employed to facilitate the certification performed in computer-implemented method 700.

At 902, the computer-implemented method 900 can comprise receiving (e.g., via communication component 112), by a system 100 operatively coupled to a processor 120, one or more dynamic parameters regarding execution of one or more pipelines. For example, the one or more dynamic parameters can be entered into the system 100 via one or more input devices 106. Further, the one or more dynamic parameters can define one or more desired security compliance exceptions. For instance, the one or more dynamic parameters can define one or more exceptions to otherwise applicable security controls.

At 904, the computer-implemented method 900 can comprise determining (e.g., via dynamic parameter component 604), by the system 100, whether the one or more dynamic parameters are permissible. For instance, the one or more received dynamic parameters can be compared (e.g., via dynamic parameter component 604) to a list of impermissible dynamic parameters. In another instance, the one or more received dynamic parameters can be compared (e.g., via dynamic parameter component 604) to a list of permissible dynamic parameters. Where the received dynamic parameters are found to be impermissible, the computer-implemented method 900 can end at 906. Where the received dynamic parameters are found to be permissible, the computer-implemented method 900 can proceed to 908.

At 908, the computer-implemented method 900 can comprise determining (e.g., via dynamic parameter component 604), by the system 100, whether to the received dynamic parameters regard one or more applicable security controls. For instance, the one or more dynamic parameters can define one or more security controls to be exempted during execution of a given pipeline. In one or more embodiments, the one or more control securities defined by the received dynamic parameters can be compared (e.g., via dynamic parameter component 604) to the one or more applicable security control profiles generated via computer-implemented method 800. Where the one or more received dynamic parameters do not define a security control included in the one or more applicable security control profiles, the computer-implemented method 900 can end at 910. Where the one or more received dynamic parameters define a security control that is included in the one or more applicable security control profiles, the computer-implemented method 900 can proceed to 912.

At 912, the computer-implemented method 900 can modify (e.g., via dynamic parameter component 604), by the system 100, the one or more applicable security control profiles (e.g., generated via the applicable security control component 402 in accordance with computer-implemented method 800) comprising the one or more applicable security controls regarded by the dynamic parameters. For example, the modifying at 912 can remove one or more security controls from the applicable security control profile based on one or more security compliance exceptions delineated by the one or more dynamic parameters. Thereby, one or more security controls that would otherwise be applicable to the given execution of the pipeline can be removed from the applicable security profile based on the received, permissible dynamic parameters.

Figure 10:
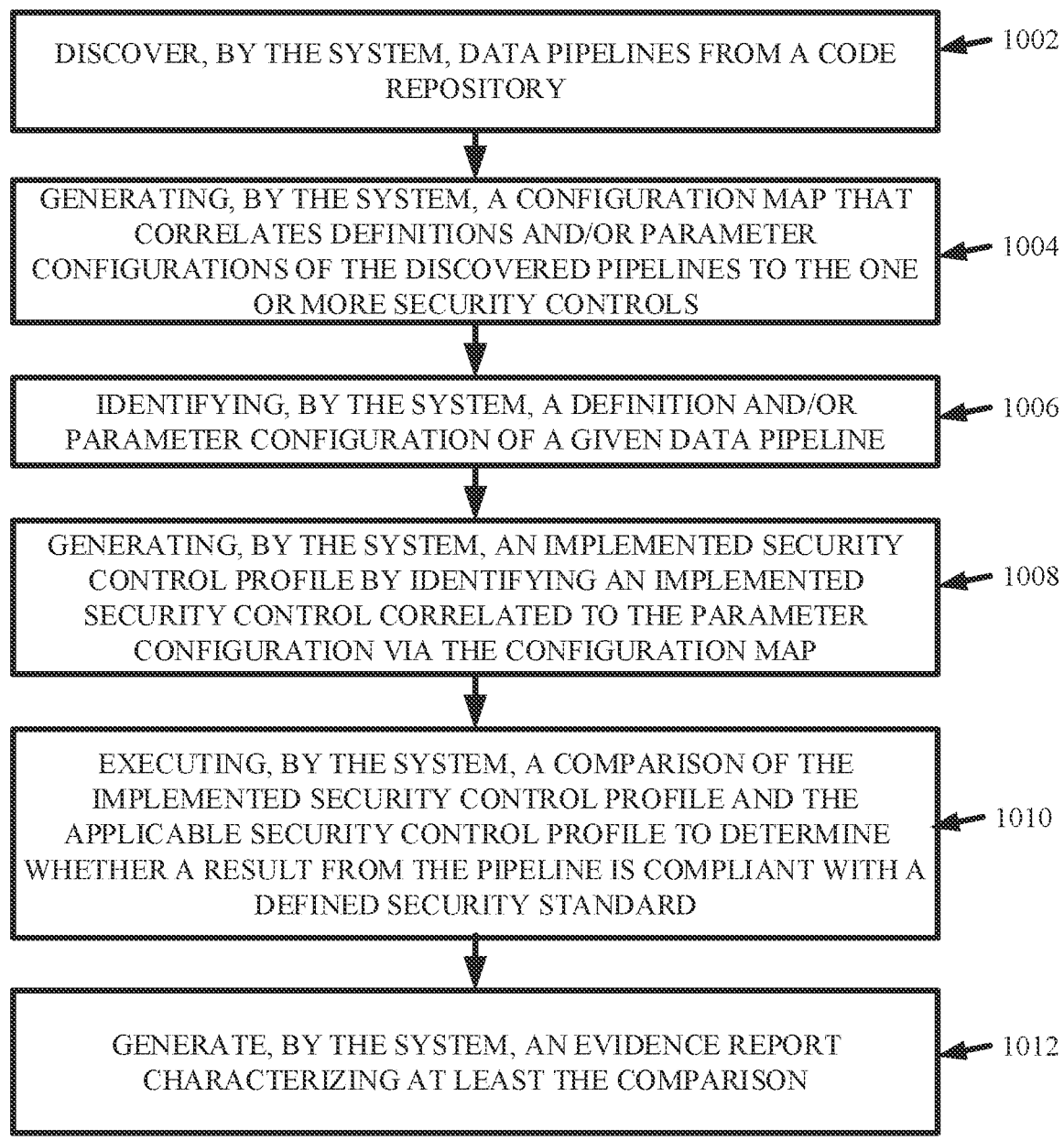
FIG. 10 illustrates a flow diagram of an example, non-limiting computer-implemented method that can facilitate determining whether the results of one or more pipelines are compliant with one or more security standards in accordance with one or more embodiments described herein.

FIG. 10 illustrates a flow diagram of an example, non-limiting computer-implemented method 1000 that can facilitate generating one or more implemented security control profiles and/or pipeline certifications in accordance with one or more embodiments described herein. Repetitive description of like elements employed in other embodiments described herein is omitted for sake of brevity. In various embodiments, computer-implemented method 1000 can be employed to facilitate the certification performed in computer-implemented method 700.

At 1010, the computer-implemented method 1000 can comprise generating (e.g., via configuration mapping component 502), by the system 100, one or more configuration maps that can correlate pipeline definitions and/or parameter configurations to the one or more security controls. At 1012, the computer-implemented method 1000 can comprise identifying (e.g., via configuration identification component 504), by the system 100, one or more definitions and/or parameter configurations of the pipeline. At 1014, the computer-implemented method 1000 can comprise generating (e.g., implemented security control component 602), by the system 100, one or more implemented security control profiles by identifying one or more implemented security controls correlated to the definition and/or parameter configuration via the one or more configuration maps. At 1016, the computer-implemented method 1000 can comprise executing (e.g., via comparison component 606), by the system 100, a comparison of the one or more implemented security control profiles and the one or more applicable security control profiles (e.g., generated in accordance with computer-implemented method 800 and/or modified in accordance with computer-implemented method 900) to determine whether the pipeline is compliant with a defined security standard.

For example, where the one or more applicable security control profiles match the one or more implemented security control profiles, results from the pipeline can be determined to be compliant with the security standard and certified at 1010. In another example, where the one or more applicable security control profiles match the one or more implemented security control profiles by a defined threshold (e.g., match by more than 80 percent), results from the pipeline can be determined to be compliant with the security standard and certified at 1010. In a further example, where the one or more applicable security control profiles do not match the one or more implemented security control profiles (e.g., entirely or by a defined threshold), results from the pipeline can be determined to be non-compliant with the security standard and not certified at 1010.

At 1012, the computer-implemented method 1000 can comprise generating (e.g., via evidence report component 608), by the system 100, one or more evidence reports characterizing at least the comparison at 1010. Further, the evidence report component 608 can characterize one or more of the other operations performed during computer-implemented methods 700, 800, 900, and/or 1000.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
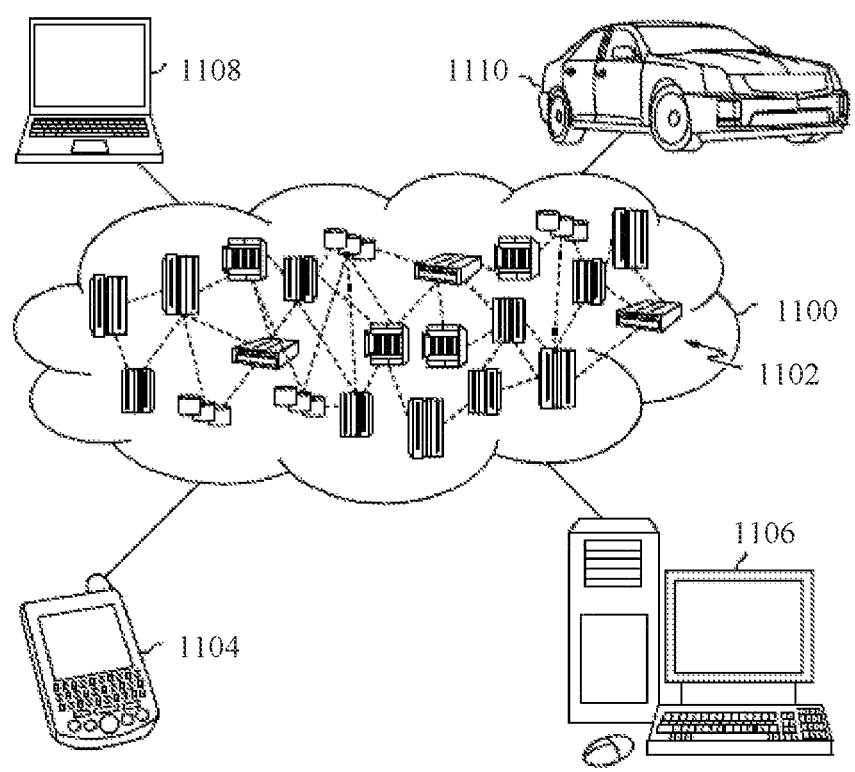
FIG. 11 depicts a cloud computing environment in accordance with one or more embodiments described herein.

Referring now to FIG. 11, illustrative cloud computing environment 1100 is depicted. As shown, cloud computing environment 1100 includes one or more cloud computing nodes 1102 with which local computing devices used by cloud consumers, such as, for example, personal digital assistant (PDA) or cellular telephone 1104, desktop computer 1106, laptop computer 1108, and/or automobile computer system 1110 may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1104-1110 shown in FIG. 11 are intended to be illustrative only and that computing nodes 1102 and cloud computing environment 1100 can communicate with any type of computerized device over any type of network and/or network addressable connection (e.g., using a web browser).

Figure 12:
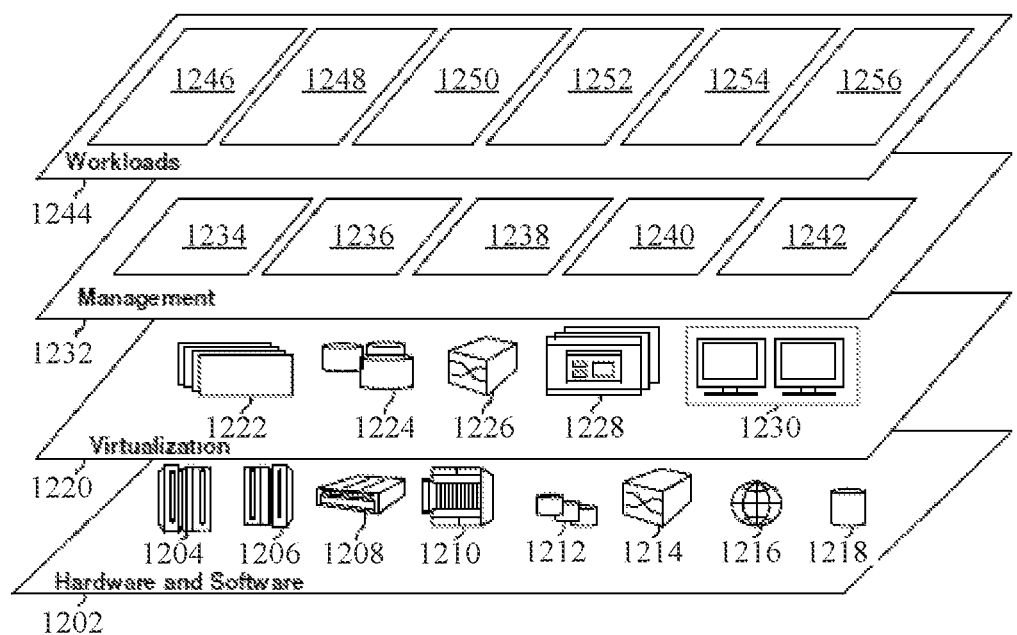
FIG. 12 depicts abstraction model layers in accordance with one or more embodiments described herein.
Figure 13:
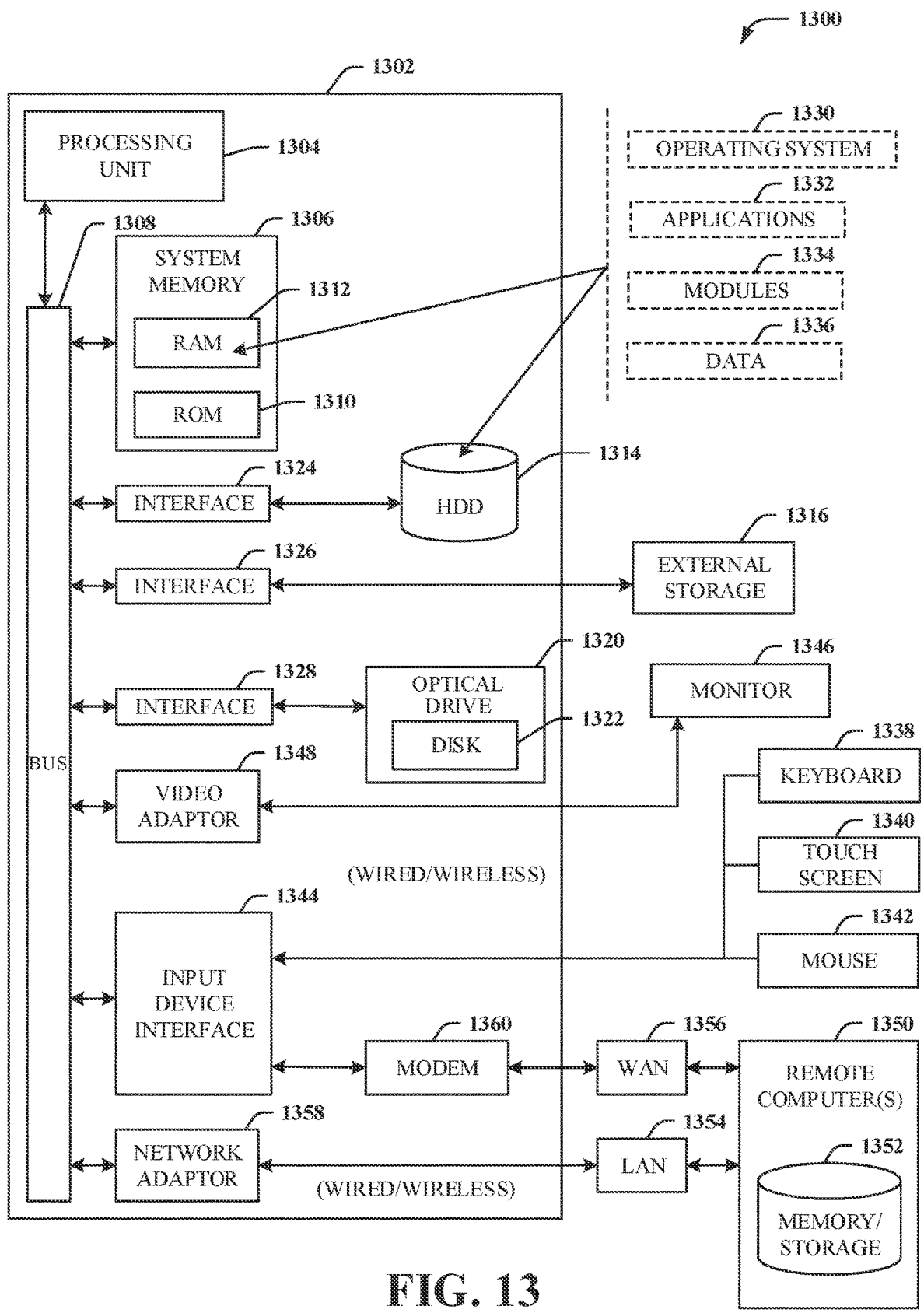
FIG. 13 illustrates a block diagram of an example, non-limiting operating environment in which one or more embodiments described herein can be facilitated.

Referring now to FIG. 12, a set of functional abstraction layers provided by cloud computing environment 1100 (FIG. 11) is shown. Repetitive description of like elements employed in other embodiments described herein is omitted for sake of brevity. It should be understood in advance that the components, layers, and functions shown in FIG. 13 are intended to be illustrative only and embodiments of the invention are not limited thereto. As depicted, the following layers and corresponding functions are provided.

Hardware and software layer 1202 includes hardware and software components. Examples of hardware components include: mainframes 1204; RISC (Reduced Instruction Set Computer) architecture based servers 1206; servers 1208; blade servers 1210; storage devices 1212; and networks and networking components 1214. In some embodiments, software components include network application server software 1216 and database software 1218.

Virtualization layer 1220 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 1232 may provide the functions described below. Resource provisioning 1234 provides dynamic procurement of computing resources and other resources that are utilized to perform tasks within the cloud computing environment. Metering and Pricing 1236 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1238 provides access to the cloud computing environment for consumers and system administrators. Service level management 1240 provides cloud computing resource allocation and management such that required service levels are met. Service Level Agreement (SLA) planning and fulfillment 1242 provide pre-arrangement for, and procurement of, cloud computing resources for which a future requirement is anticipated in accordance with an SLA.

Workloads layer 1244 provides examples of functionality for which the cloud computing environment may be utilized. Examples of workloads and functions which may be provided from this layer include: mapping and navigation 1246; software development and lifecycle management 1248; virtual classroom education delivery 1250; data analytics processing 1252; transaction processing 1254; and pipeline certification 1256. Various embodiments of the present invention can utilize the cloud computing environment described with reference to FIGS. 11 and 12 to automatically analyze one or more pipelines for security compliance.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

In order to provide additional context for various embodiments described herein, FIG. 13 and the following discussion are intended to provide a general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system ("BIOS") can be stored in a non-volatile memory such as ROM, erasable programmable read only memory ("EPROM"), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive ("HDD") 1314 (e.g., EIDE, SATA), one or more external storage devices 1316 (e.g., a magnetic floppy disk drive ("FDD") 1316, a memory stick or flash drive reader, a memory card reader, a combination thereof, and/or the like) and an optical disk drive 1320 (e.g., which can read or write from a CD-ROM disc, a DVD, a BD, and/or the like). While the internal HDD 1314 is illustrated as located within the computer 1302, the internal HDD 1314 can also be configured for external use in a suitable chassis (not shown). Additionally, while not shown in environment 1300, a solid state drive ("SSD") could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine ("VM") of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1302, e.g., applied at the application execution level or at the operating system ("OS") kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, and/or the like.

A monitor 1346 or other type of display device can be also connected to the system bus 1308 via an interface, such as a video adapter 1348. In addition to the monitor 1346, a computer typically includes other peripheral output devices (not shown), such as speakers, printers, a combination thereof, and/or the like.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network ("LAN") 1354 and/or larger networks, e.g., a wide area network ("WAN") 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point ("AP") disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a typical network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
     a certification component that:
       scans static code assets from a code repository to categorize source artifacts,
       generates an artifact map that correlates categorized source artifacts to one or more security controls,
       identifies a source artifact associated with a computer application, wherein the source artifact is one of multiple source artifacts associated with the computer application,
       generates an applicable security control profile by identifying at least one security control correlated to the source artifact via the artifact map, wherein the applicable security control profile comprises a plurality of security controls mapped to the multiple source artifacts, and
     certifies a result from an execution of a pipeline for the computer application based on a comparison of an implemented security control profile associated with the pipeline and the applicable security control profile associated with the computer application.

2. The system of claim 1, wherein the certification component further removes an applicable security control from the applicable security control profile based on a dynamic parameter that defines a security compliance exception.

3. The system of claim 2, wherein the dynamic parameter comprises a license requirement exception.

4. The system of claim 2, wherein the dynamic parameter comprises an ignored list of vulnerabilities.

5. The system of claim 2, wherein the dynamic parameter comprises a list of allowed package dependencies.

6. The system of claim 1, wherein the certification component further:
generates a configuration map that correlates pipeline parameters configurations to the one or more security controls; and
identifies a parameter configuration of the pipeline.

7. The system of claim 6, wherein the certification component further generates the implemented security control profile by identifying an implemented security control correlated to the parameter configuration via the configuration map.

8. The system of claim 1, wherein the certification component further:
executes the comparison of the implemented security control profile and the applicable security control profile to determine whether the result from the pipeline is compliant with a defined security standard; and
generates an evidence report that characterizes the comparison.

9. A computer-implemented method, comprising:
scanning, by a system operatively coupled to a processor, static code assets from a code repository to categorize source artifacts;
generating, by the system, an artifact map that correlates categorized source artifacts to one or more security controls;
identifying, by the system, a source artifact associated with a computer application;
generating, by the system, an applicable security control profile by identifying at least one security control correlated to the source artifact via the artifact map;
removing, by the system, an applicable security control from the applicable security control profile based on a dynamic parameter that defines a security compliance exception; and
certifying, by the system, a result from an execution of a pipeline for the computer application based on a comparison of an implemented security control profile associated with the pipeline and the applicable security control profile associated with the computer application.

10. The computer-implemented method of claim 9, further comprising:
generating, by the system, a configuration map that correlates pipeline parameter configurations to the one or more security controls;
identifying, by the system, a parameter configuration of the pipeline; and
generating, by the system, the implemented security control profile by identifying an implemented security control correlated to the parameter configuration via the configuration map.

11. The computer-implemented method of claim 9, further comprising:
executing, by the system, the comparison of the implemented security control profile and the applicable security control profile to determine whether the result from the pipeline is compliant with a defined security standard.

12. The computer-implemented method of claim 9, wherein the dynamic parameter comprises a license requirement exception.

13. The computer-implemented method of claim 9, wherein the dynamic parameter comprises an ignored list of vulnerabilities.

14. The computer-implemented method of claim 9, wherein the dynamic parameter comprises a list of allowed package dependencies.

15. A computer program product for pipeline certification, the computer program product comprising a computer readable storage medium having program instructions embodied therewith, the program instructions executable by a processor to cause the processor to:
scan, by the processor, static code assets from a code repository to categorize source artifacts;
generate, by the processor, an artifact map that correlates categorized source artifacts to one or more security controls;
identify, by the processor, a source artifact associated with a computer application, wherein the source artifact is one of multiple source artifacts associated with the computer application;
generate, by the processor, an applicable security control profile by identifying at least one security control correlated to the source artifact via the artifact map, wherein the applicable security control profile comprises a plurality of security controls mapped to the multiple source artifacts;
certify, by the processor, a result from an execution of a pipeline for a computer application based on a comparison of an implemented security control profile associated with the pipeline and an applicable security control profile identified from a source artifact associated with the computer application.

16. The computer program product of claim 15, wherein the program instructions further cause the processor to:
generate, by the processor, a configuration map that correlates pipeline parameters configurations to the one or more security controls; and
identify, by the processor, a parameter configuration of the pipeline.

17. The computer program product of claim 16, wherein the program instructions further cause the processor to:
generate, by the processor, the implemented security control profile by identifying an implemented security control correlated to the parameter configuration via the configuration map.

18. The computer program product of claim 15, wherein the program instructions further cause the processor to:
execute, by the processor, the comparison of the implemented security control profile and the applicable security control profile to determine whether the result from the pipeline is compliant with a defined security standard.

19. The computer program product of claim 15, wherein the program instructions further cause the processor to:
remove, by the processor, an applicable security control from the applicable security control profile based on a dynamic parameter that defines a security compliance exception.

20. The computer program product of claim 19, wherein the dynamic parameter comprises at lease one of a license requirement exception, an ignored list of vulnerabilities, or a list of allowed package dependencies.

* * * * *